United States Patent
Raaf

(10) Patent No.: US 6,958,991 B1
(45) Date of Patent: Oct. 25, 2005

(54) OPTIMIZED ADJACENT CHANNEL SEARCH AND TIMESLOT ASSIGNMENT FOR MULTIPLE TIMESLOT MOBILE STATIONS

(75) Inventor: Bernhard Raaf, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/536,174

(22) Filed: Mar. 27, 2000

Related U.S. Application Data

(63) Continuation of application No. PCT/DE98/02452, filed on Aug. 21, 1998.

(30) Foreign Application Priority Data

Sep. 25, 1997 (DE) .............................. 197 42 388

(51) Int. Cl.$^7$ ............................................ H04B 7/212
(52) U.S. Cl. .................. 370/348; 370/352; 370/437; 370/442; 455/509; 455/517
(58) Field of Search ............................. 370/329, 337, 370/338, 347, 352, 348, 437, 442; 455/509, 455/517

(56) References Cited

U.S. PATENT DOCUMENTS

| | | | | |
|---|---|---|---|---|
| 5,177,740 A | * | 1/1993 | Toy et al. ................... | 370/337 |
| 5,479,410 A | * | 12/1995 | Paavonen ................... | 370/332 |
| 5,966,378 A | * | 10/1999 | Hamalainen ................ | 370/348 |
| 5,987,019 A | * | 11/1999 | Raith et al. ................. | 370/347 |
| 5,995,515 A | * | 11/1999 | Suzuki ....................... | 370/465 |
| 6,028,853 A | * | 2/2000 | Haartsen .................... | 370/338 |

OTHER PUBLICATIONS

Published International Application No. WO 96/01534 (Kohlschmidt), dated Jan. 18, 1996.
Published International Application No. WO 97/15156 (Raith et al.), dated Apr. 24, 1997.

* cited by examiner

*Primary Examiner*—Dang Ton
*Assistant Examiner*—Inder Pal Mehra
(74) *Attorney, Agent, or Firm*—Laurence A. Greenberg; Werner H. Stemer; Ralph E. Locher

(57) ABSTRACT

A method and a system for transmission of data packets between base stations and mobile stations in a mobile radio system includes transmitting each of the data packets in time frames having a fixed number of timeslots, and a mobile station transmitting data packets in a plurality of successive timeslots. In the method and system, while the mobile station is connected to a present base station, a transmitting unit of the present base station transmitting control data packets or no data packets to the mobile station during predetermined time frames while the mobile station is connected to the given base station, and respectively making available to a receiving unit of the mobile station a time interval longer than a predetermined time frame for receiving synchronization data packets and/or measuring signal levels of adjacent base stations.

16 Claims, 12 Drawing Sheets

Overlap Area
(abt. Equal to 0 at least
for Timing Advance)

PRIOR ART
FIG 12
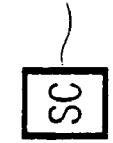
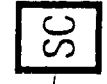
Illustration of Times Available for Adjacent Channel Search and SACCH.
Critical Position of the Adjacent Sync-Bursts

OPTIMIZED ADJACENT CHANNEL SEARCH AND TIMESLOT ASSIGNMENT FOR MULTIPLE TIMESLOT MOBILE STATIONS

CROSS-REFERENCE TO RELATED APPLICATION

This is a continuation of copending International Application PCT/DE98/02452, filed Aug. 21, 1998, which designated the United States.

BACKGROUND OF THE INVENTION

Field of the Invention:

The invention lies in the field of communications. The invention relates to a method for transmitting data packets between at least one base station and at least one mobile station in a mobile radio system, and to a system for transmitting data packets between at least one base station and at least one mobile station in a mobile radio system.

Methods and systems for transmitting data packets between at least one base station and at least one mobile station in a mobile radio system exist. During a call, that is to say when connected, a mobile station in a mobile radio system regularly has to search predetermined frequencies for data packets from adjacent base stations, and to recognize the identity of the base stations, while the mobile station is connected to a present or current base station. Decoding the base station identity code (BSIC) in the synchronization data packet generally carries out the identity recognition. To perform decoding, each base station regularly transmits synchronization data packets. In the GSM Standard, the base stations transmit a synchronization data packet every 10 or 11 time frames, lasting for one timeslot, and with eight timeslots forming a frame.

In the GSM Standard, when a mobile station is making a call, it can monitor an adjacent channel every 26 frames, for a period of somewhat more than one time frame. The one predetermined time frame is called the idle frame, in which the mobile station does not interchange any data with the present base station. The predetermined time frame is used to monitor adjacent channels and, possibly, to find and to decode synchronization data packets from adjacent base stations. In the GSM Standard, the base stations transmit five synchronization data packets, with a duration of one timeslot, within one multiframe, including 51 time frames. The synchronization data packets are transmitted by the base stations four times every 10 frames and then once after 11 frames. Because the mobile station has a predetermined time frame for monitoring the adjacent channels available every 26 time frames, a mobile station can receive a synchronization data packet from an adjacent base station after at most 11 blank time frames, regardless of the relative timing of the synchronization data packets of the base stations.

Standard mobile stations in the GSM system use only one of eight possible timeslots per time frame for interchanging data with a respective base station. In order to achieve higher data rates, multiple timeslot mobile stations have been defined (the GSM term is HSDSC) which, in the extreme, can receive and/or transmit data in up to all eight timeslots. The invention relates in particular to such multiple timeslot mobile stations.

As mentioned above, a standard mobile station can monitor an adjacent channel, while making a call, every 26 frames for a period of somewhat more than one time frame, in other words, for approximately nine timeslots. Monitoring is necessary because the respective base station and the mobile station are not yet synchronized, and the respective timeslots may be shifted with respect to one another. In multiple timeslot mobile stations, a problem that arises is that the time frames before and after the predetermined time frame may be occupied by the transmission of data packets, and that the predetermined time frame with eight timeslots is too short to allow a synchronization data packet from an adjacent base station to be received and studied reliably. Therefore, there is a critical relative phase area in which the synchronization data packet (SC burst) is located in such an unfavorable manner that it cannot be received and decoded. Such a condition is precisely what happens if the synchronization data packet overlaps the boundary of the predetermined time frame. The situation is shown in FIG. 12.

In FIG. 12, solid lines are used to show the time frames with timeslots 0, 1 . . . 7 in which a mobile station receives data packets from a present base station. The predetermined time frames that are available for reception of synchronization data packets and/or for measurement of signal levels of adjacent base stations as well are identified by dashed lines. In FIG. 12, the upper line shows the timing sequence for the time around a predetermined time frame, during which the base station does not transmit any data packets, and the lower line shows the timing sequence at a later time, with subsequent predetermined time frame, during which the base station is transmitting SACCH data packets. The time axes have been chosen so that the timing of the synchronization data packet (SC burst) from the adjacent base station is the same. S0 to S7 are the timeslot numbers of the SACCH channel, while 0 to 7 are the timeslot numbers for the wanted data channels. The two small boxes with bold boundaries represent the two critical locations of the synchronization data packet from the adjacent base station, which are each located directly at the boundary of the predetermined time frame. If the mobile station switches to reception of synchronization data packets from the adjacent base station only during the eight timeslots that are available during the predetermined time frame, then the synchronization data packets that arrive from the adjacent base station in one of the indicated locations cannot be completely received, and, thus, cannot be decoded and used.

In order to overcome the problem, in addition to a first receiver, a second receiver is provided in conventional multiple timeslot mobile stations, and is used specifically for reception of synchronization data packets and/or for measurement of signal levels from adjacent base stations. Thus, the second receiver is operated in parallel with the first receiver and is used during the entire time interval that is required for monitoring and/or reception of synchronization data packets from adjacent base stations. However, the use of a second receiver is costly and wastes energy.

SUMMARY OF THE INVENTION

It is accordingly an object of the invention to provide an optimized adjacent channel search and timeslot assignment method and system for multiple timeslot mobile stations that overcomes the hereinafore-mentioned disadvantages of the heretofore-known methods and devices of this general type and that eliminates the need for using a second receiver in the mobile stations.

With the foregoing and other objects in view, there is provided, in accordance with the invention, in a method for transmission of data packets between at least one base station and at least one mobile station in a mobile radio system, the improvement including transmitting each of the data packets in time frames having a fixed number of timeslots, transmitting data packets from a mobile station in a plurality of successive timeslots, transmitting at least one of control data packets and no data packets from a given base station to the mobile station during predetermined time frames while the mobile station is connected to the given base station, and respectively making available to the mobile station a time interval longer than a predetermined time frame for at least one of receiving synchronization data packets and measuring signal levels of adjacent base stations.

In the method for transmission of data packets, the time interval, which is longer than a predetermined time frame, is respectively made available to the mobile station in order to receive synchronization data packets and/or signal levels of adjacent base stations. Therefore, the invention advantageously avoids the use of a second receiver in the base station, thus allowing the costs and the energy consumption in the base station to be reduced considerably.

In accordance with another mode of the invention, during the time interval, the mobile station switches to reception of at least one of synchronization data packets and measurement of signal levels of adjacent base stations.

Advantageously, the mobile station is switched, during the time interval, to reception of synchronization data packets and/or to measurement of signal levels of adjacent base stations. It is also advantageous for the mobile station at least partially not to receive the data packet transmitted by the transmitting unit of the present base station in each case immediately before and/or after a predetermined time frame.

In accordance with a further mode of the invention, the given base station transmits the data packet at least one of immediately before and immediately after a predetermined time frame is at least partially not received by the mobile station.

In accordance with an added mode of the invention, the mobile station reconstructs data packets at least partially not received using redundant coding of other received data packets.

Furthermore, those data packets at least partially not received are reconstructed by the mobile station, in an advantageous manner, by the redundant coding and the other received data packets.

In accordance with an additional mode of the invention, the data packet transmitted by the given base station is transmitted once again at least one of immediately before or immediately after the predetermined time frame on at least one of the end and the start of the predetermined time frame.

In this case, the data packet transmitted by the present base station immediately before or after the predetermined time frame is advantageously transmitted once again at the end or at the start of the predetermined time frame. Alternatively, the data packet transmitted by the present base station immediately before or after the predetermined time frame can be transmitted once again during the predetermined time frame and, respectively, can be received by the mobile station.

In accordance with yet another mode of the invention, the data packet transmitted by the given base station is transmitted once again at least one of immediately before or immediately after the predetermined time frame during the predetermined time frame, and the mobile station receives the data packet.

In accordance with yet a further mode of the invention, a length of the time interval during which the mobile station is switched to reception of synchronization data packets from adjacent base stations is chosen such that the mobile station can receive a first part of a synchronization data packet in a first time interval, and can receive a second part of a synchronization data packet in a second time interval.

The length of the time interval during which the mobile station is switched to reception of synchronization data packets from adjacent base stations is advantageously chosen such that the mobile station can receive a first part of a synchronization data packet in a first time interval, and can receive a second part of a synchronization data packet in a second time interval. The first part and the second part may each contain at least one section of the training sequence of the synchronization data packet that allows a respective channel equalization to be determined.

In accordance with yet an added mode of the invention, having the first part of the synchronization data packet and the second part of the synchronization data packet each contain at least one section of a training sequence of the synchronization data packet to allow a channel equalization to be determined.

In accordance with yet an additional mode of the invention, a first mobile station transmits data packets and is switched to receiving data packets at different times, a second mobile station is switched to reception of data packets in timeslots during which the first mobile station is transmitting data packets, and data packets are transmitted in timeslots during which the first mobile station is switched to reception of data packets.

Advantageously, a first mobile station transmits data packets and is switched to reception of data packets at different times, with a second mobile station being switched to reception of data packets in timeslots in which the first mobile station is transmitting data packets, and transmitting data packets in timeslots in which the first mobile station is switched to reception of data packets.

With the objects of the invention in view, there is also provided a system for transmission of data packets in a mobile radio system, including at least one base station having a transmitting unit, and at least one mobile station having a receiving unit, the at least one base station and the at least one mobile station transmitting data packets in time frames having a fixed number of timeslots, the at least one mobile station transmitting data packets in a plurality of successive timeslots, in which, while the at least one mobile station is connected to a given one of the at least one base station, the transmitting unit of the given base station transmits at least one of control data packets and no data packets to the at least one mobile station during a predetermined time frame, a respective one of said receiving units of the at least one mobile station has available a time interval longer than the predetermined time frame for at least one of receiving synchronization data packets and measuring signal levels of adjacent base stations.

In the system for transmission of data packets, a time interval, which is longer than a predetermined time frame, is respectively made available to a receiving unit of the mobile station in order to receive synchronization data packets and/or to measure signal levels of adjacent base stations. Therefore, the invention advantageously avoids the use of a second receiver in the base station, thus allowing the costs and the energy consumption in the base station to be reduced considerably.

In accordance with again another feature of the invention, the receiving unit of the at least one mobile station switches to at least one of reception of synchronization data packets and measurement of signal levels of adjacent base stations during the predetermined time interval.

In accordance with again a further feature of the invention, the receiving unit of the at least one mobile station at least partially does not receive a data packet transmitted by the transmitting unit of the given base station at least one of immediately before and immediately after the predetermined time frame.

In accordance with again an added feature of the invention, the at least one mobile station has a processing unit reconstructing data packets at least partially not received using redundant coding of other received data packets.

In accordance with again an additional feature of the invention, the transmitting unit of the given base station transmits once again a data packet transmitted at least one of immediately before and immediately after the predetermined time frame on at least one of the end and the start of the predetermined time frame.

In accordance with still another feature of the invention, the transmitting unit of the given base station transmits once again the data packet transmitted at least one of immediately before and immediately after the predetermined time frame during the predetermined time frame, and the receiving unit of the at least one mobile station receives the data packet.

In accordance with still a further feature of the invention, a length of the time interval during which the receiving unit of the at least one mobile station switches to reception of synchronization data packets from adjacent base stations is chosen such that the receiving unit of the at least one mobile station can receive a first part of a synchronization data packet in a first time interval, and can receive a second part of a synchronization data packet in a second time interval.

In accordance with still an added feature of the invention, the first part and the second part of the synchronization data packet each contain at least one section of a training sequence of the synchronization data packet allowing a respective channel equalization to be determined.

In accordance with a concomitant feature of the invention, the at least one mobile station is two mobile stations including a first mobile station transmitting data packets and switched to receiving data packets at different times, and a second mobile station switched to receiving data packets in timeslots during which the first mobile station transmits data packets and transmits data packets in timeslots during which the first mobile station is switched to reception of data packets.

Other features that are considered as characteristic for the invention are set forth in the appended claims.

Although the invention is illustrated and described herein as embodied in an optimized adjacent channel search and timeslot assignment for multiple timeslot mobile stations, it is nevertheless not intended to be limited to the details shown because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 9 a diagrammatic illustration of critical overlapping areas in prior art multiple timeslot mobile stations;

FIG. 10 a diagrammatic illustration of a eighth exemplary embodiment FIG. 2;

FIG. 11 a diagrammatic illustration of a ninth exemplary embodiment FIG. 2; and

FIG. 12 is a diagrammatic illustration of a critical position of synchronization data packets in a prior art mobile radio system.

DESCRIPTION OF THE PREFERRED EMBODIMENTS

Figure 1:
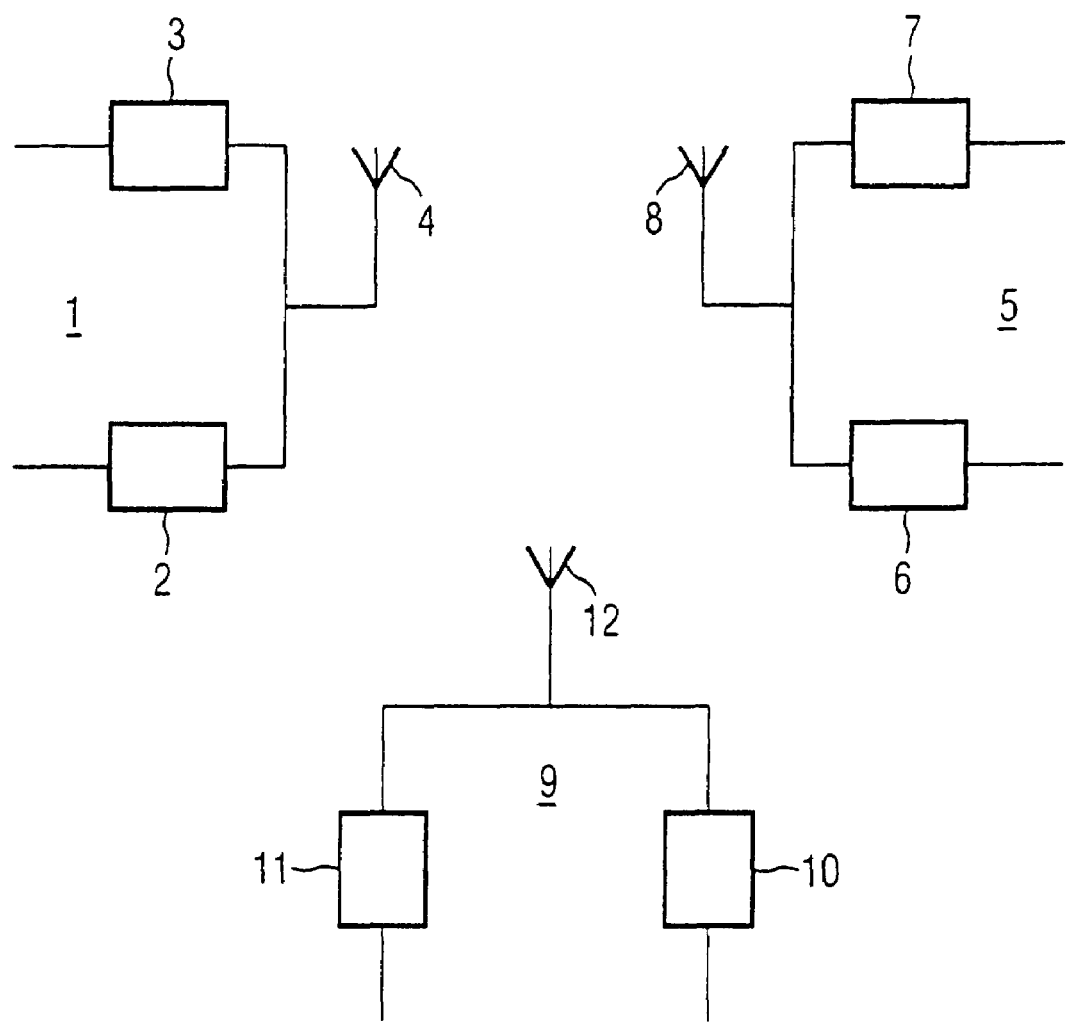
FIG. 1 is a functional block diagram of a mobile radio system with a base station, an adjacent base station, and a mobile station according to the invention.

In all the figures of the drawing, sub-features and integral parts that correspond to one another bear the same reference symbol in each case.

Referring now to the figures of the drawings in detail and first, particularly to FIG. 1 thereof, there is shown the basic configuration of a mobile radio system with a base station 1 including a receiving unit 2, a transmitting unit 3 and a conventional antenna 4. Also shown is a mobile station 5 having a receiving unit 6, a transmitting unit 7, and a conventional antenna 8. An adjacent base station 9 is likewise provided and includes a receiving unit 10, a transmitting unit 11, and a conventional antenna 12. The mobile station 5 is connected to the present base station 1 to make a call and, during predetermined time frames (during which the present base station 1 does not transmit any data packets or control data packets, such as SACCH data, to the mobile station 5) switches to reception of synchronization data packets and/or to measurement of signal levels from the adjacent base station 9. According to the invention, the receiving unit 6 of the mobile station 5 switches to reception of synchronization data packets and/or to measurement of signal levels, inter alia, from the adjacent base station 9 during a time interval, or a portion of a time interval, which is longer than a predetermined time frame.

A common feature of the exemplary embodiments of the invention shown in FIGS. 2 to 7 is that the transmitting unit 3 of the base station 1 once again transmits a data packet, which has been sent to the mobile station 5 and is located immediately before or after the predetermined time frame. In the exemplary embodiments in FIGS. 2 to 5 and 7, the data packet that has been transmitted once again is transmitted once again at the end or at the start of the predetermined time frame while, in the exemplary embodiment in FIG. 6, the transmitting unit 3 of the present base station 1 once again transmits the data packet, which has been transmitted once again, during the predetermined time frame, and the receiving unit 6 of the mobile station 5 receives the data packet during the predetermined time frame as well.

The illustration of the exemplary embodiments in FIGS. 2 to 7 corresponds to the illustration in FIG. 12. The topmost line in each case shows the data packets transmitted by the present base station 1 in the timeslots 0 to 7 by solid lines, while a predetermined time frame during which the base station 1 does not transmit any data packets is shown by the dashed lines.

The search by the mobile station 5 for synchronization data packets and the measurement of signal levels from the adjacent base station 9 each take place in the timeslots 0 to 7, which are shown in the second line and are represented by solid lines. The small boxes with bold boundaries, which identify the critical positions of the synchronization data packets (SC bursts) transmitted by the adjacent base station 9 (see FIG. 12) are not shown in FIGS. 2 to 7 and 9 to 11. In a standard mobile station, the measurement of the signal levels and of the adjacent field strengths is carried out in a timeslot that is not used for transmission or reception, and with a multiple timeslot mobile station the measurement can likewise be done in the predetermined time frame. The option is shown in the figures of the drawing by the small boxes denoted NB, which identify timeslots in which the mobile station 5 measures the field strength of the channels and/or the signal levels of adjacent base stations.

Figure 2:
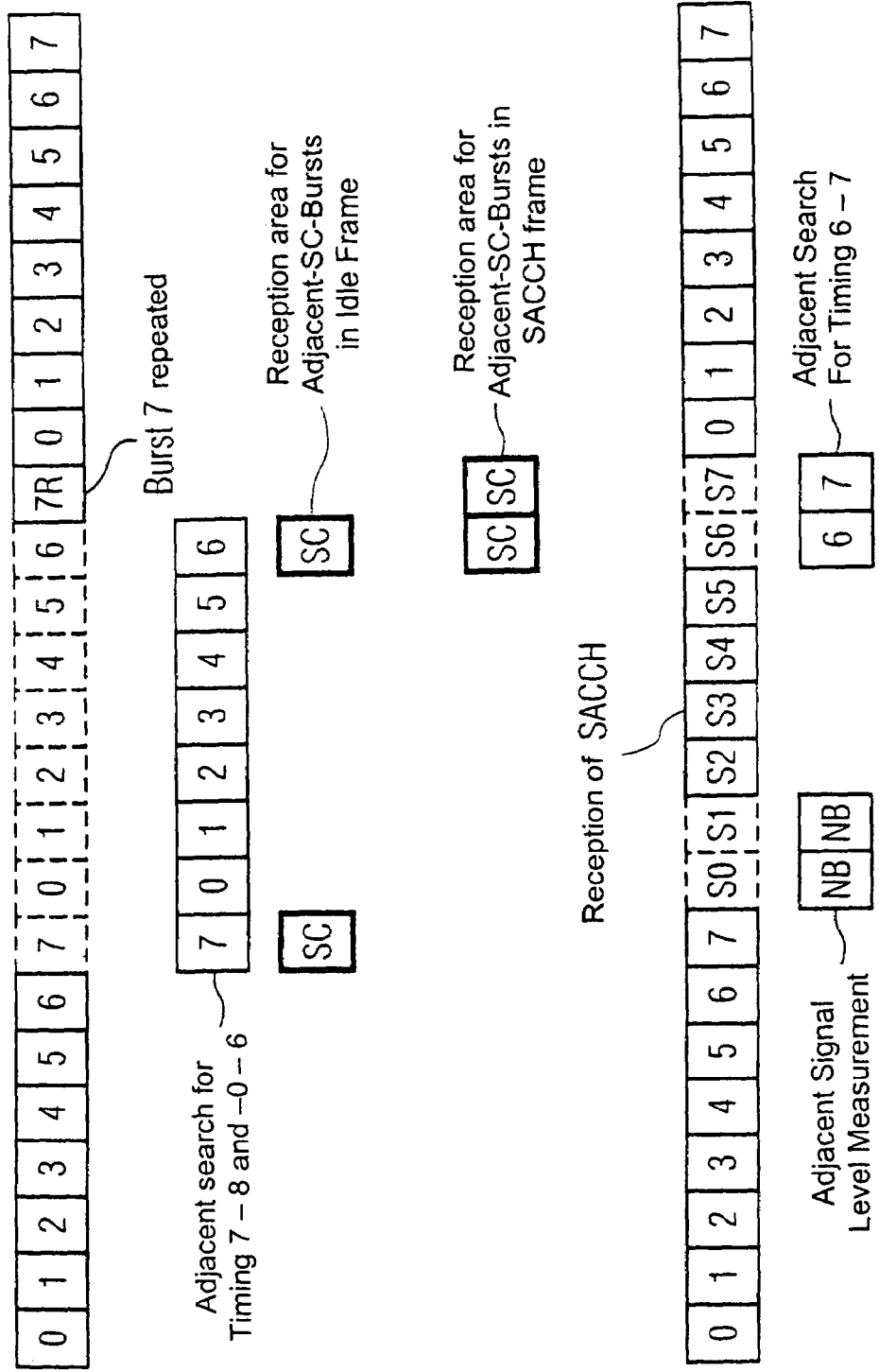
FIG. 2 is a diagrammatic illustration of a first exemplary embodiment of data packet transmission according to the invention.
Figure 3:
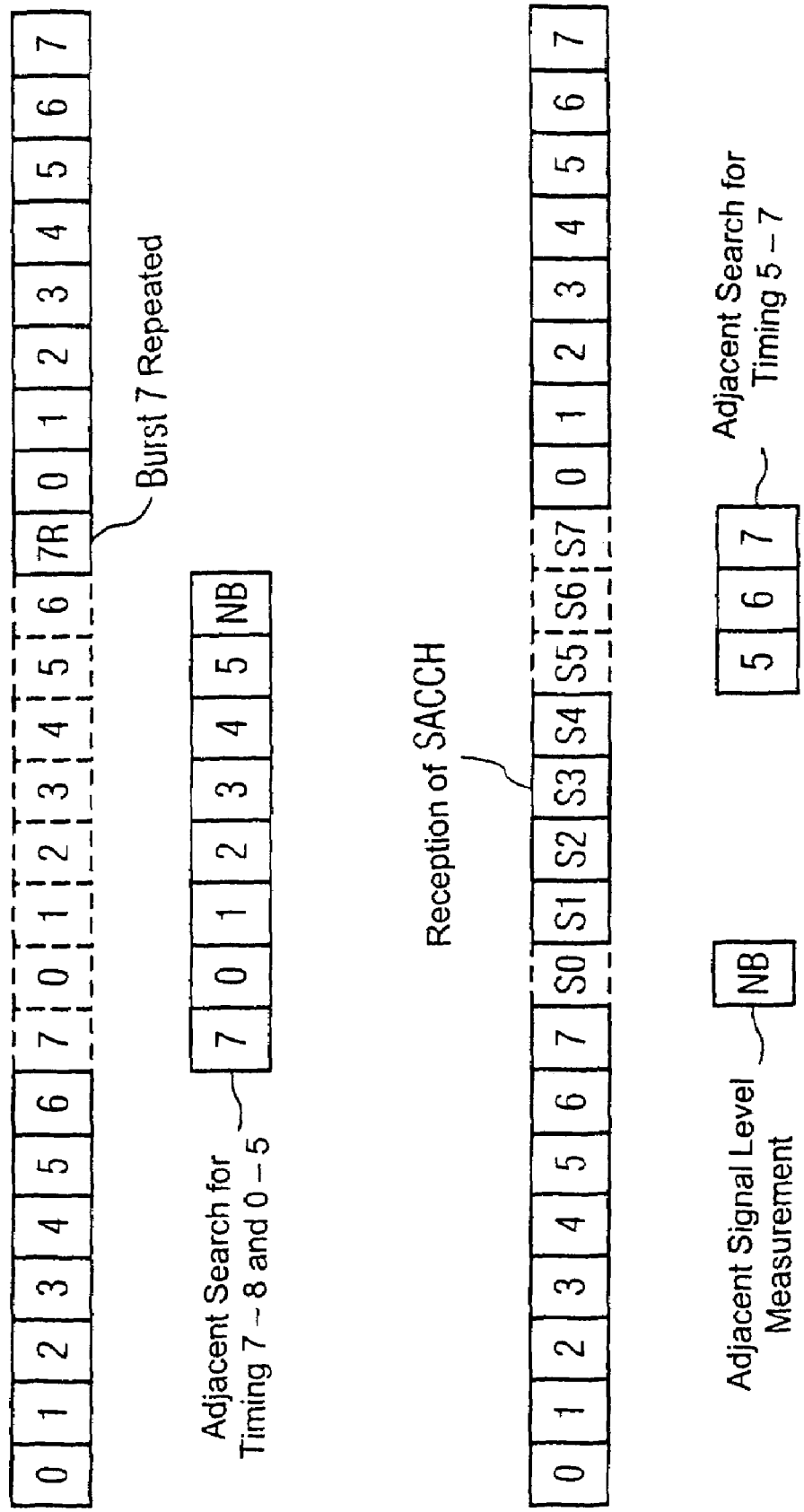
FIG. 3 is a diagrammatic illustration of a second exemplary embodiment FIG. 2.

Furthermore, in the exemplary embodiments of FIGS. 2 and 3, it is possible for the mobile station 5 not to receive any SACCH data packets, or not to receive all of them, from the base station in specific timeslots of the SACCH time frame. In the present version of the GSM Recommendations, a mobile station has to receive SACCH data packets in all the timeslots of an SACCH time frame and (at least) must also use the information in the timeslots in which it is transmitting. Thus, the power of the mobile stations in the uplink is regulated. However, it is also possible to dispense with reception of certain timeslots, in which case the mobile station must then use the same power as for the other timeslots. The foregoing principle is already used in a downlink in a situation where a mobile station transmits in fewer timeslots than in those that it receives. The lower lines of the illustrations in FIGS. 2 and 3 each show such a situation, in which the reception of SACCH data packets in four timeslots of the SACCH time frame (S0, S1, . . . , S7) has been dispensed with.

FIG. 2 shows the first exemplary embodiment of the invention, in which the base station 1 once again transmits the data packet from the timeslot 7 immediately before the predetermined time frame at the end of the blank time frame. The redundantly repeated data packet is identified by the small box 7R. The redundant transmission of the last data packet before the predetermined data packet at the end of the predetermined data packet is also carried out in the second to fifth exemplary embodiments in FIGS. 3 to 6.

Figure 7:
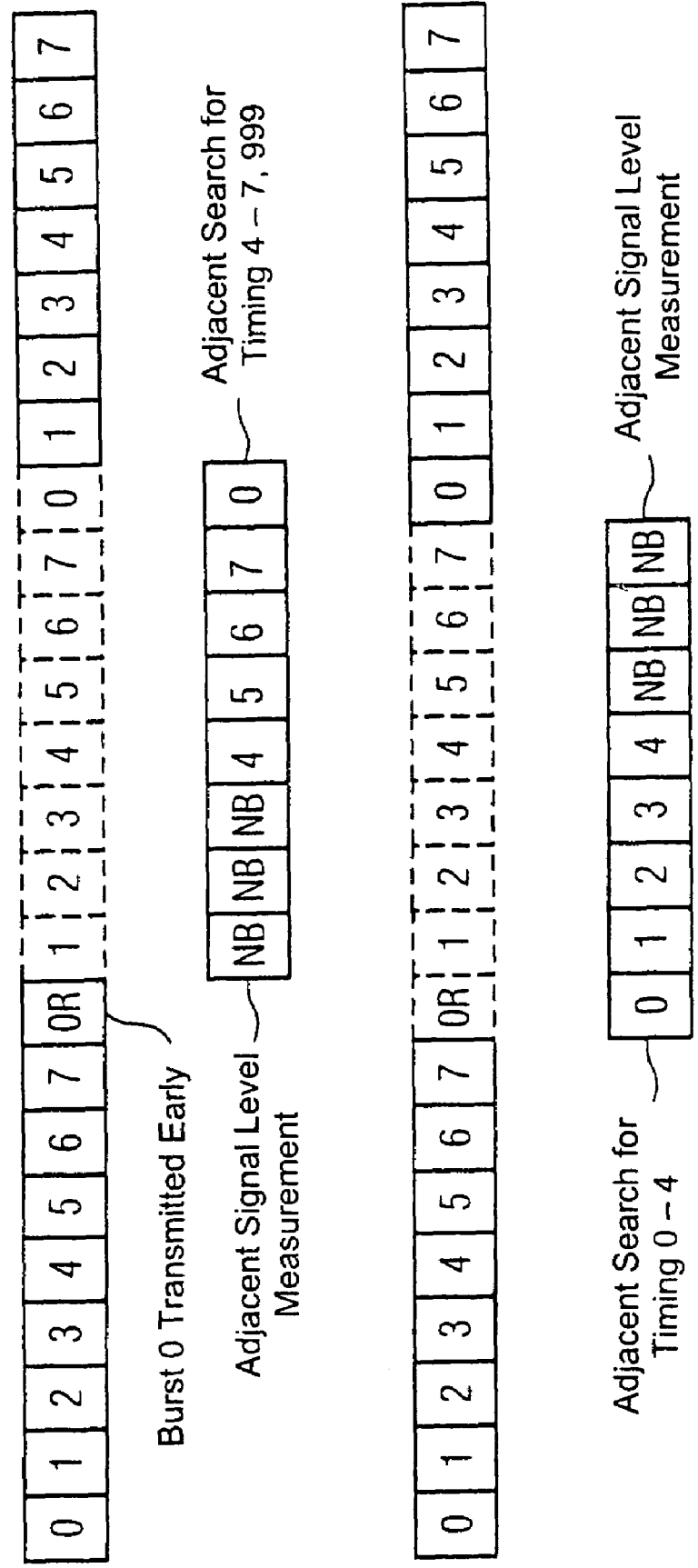
FIG. 7 a diagrammatic illustration of a sixth exemplary embodiment FIG. 2.

In the sixth exemplary embodiment shown in FIG. 7, the data packet from the timeslot 0 is transmitted immediately after the predetermined data packet and, actually, at the start of the predetermined data packet, as is identified by the small box 0R.

Therefore, a common feature of all the exemplary embodiments shown in FIGS. 2 to 7 is that the data packets that are transmitted in a timeslot at the boundary of the predetermined time frame are transmitted by the base station 1 twice, and the mobile station 5 can then optionally also receive the information at the alternative time, thus gaining additional time to carry out the search for synchronization data packets and/or for measurement of signal levels from the adjacent base station 9. The additionally obtained time is just sufficient to allow the synchronization of the adjacent base stations to be carried out in all the cases that occur.

As the lower line in FIG. 2 shows, the receiving unit 6 of the mobile station 5 is switched to reception and measurement of signal levels from adjacent base stations during the first two timeslots S0, S1 of the SACCH time frame. In the last two timeslots 6 and 7 of the SACCH time frame, the receiving unit 6 of the mobile station 5 is switched to reception of synchronization data packets from adjacent base stations.

In the exemplary embodiment shown in FIG. 3, the receiving unit 6 of the mobile station 5 is switched to reception and to measurement of adjacent signal levels in the last timeslot (i.e., timeslot 6) of the time frame 7, 0 . . . 6 that is used for reception of synchronization data packets from the adjacent base station 9. In the SACCH time frame, the first timeslot S0 is used to measure adjacent levels, while the last three timeslots S5, S6 and S7 are used to search for synchronization data packets. The timeslots S1, S2, S3, S4 of the SACCH frame are received, as intended, by the base station 1.

Figure 4:
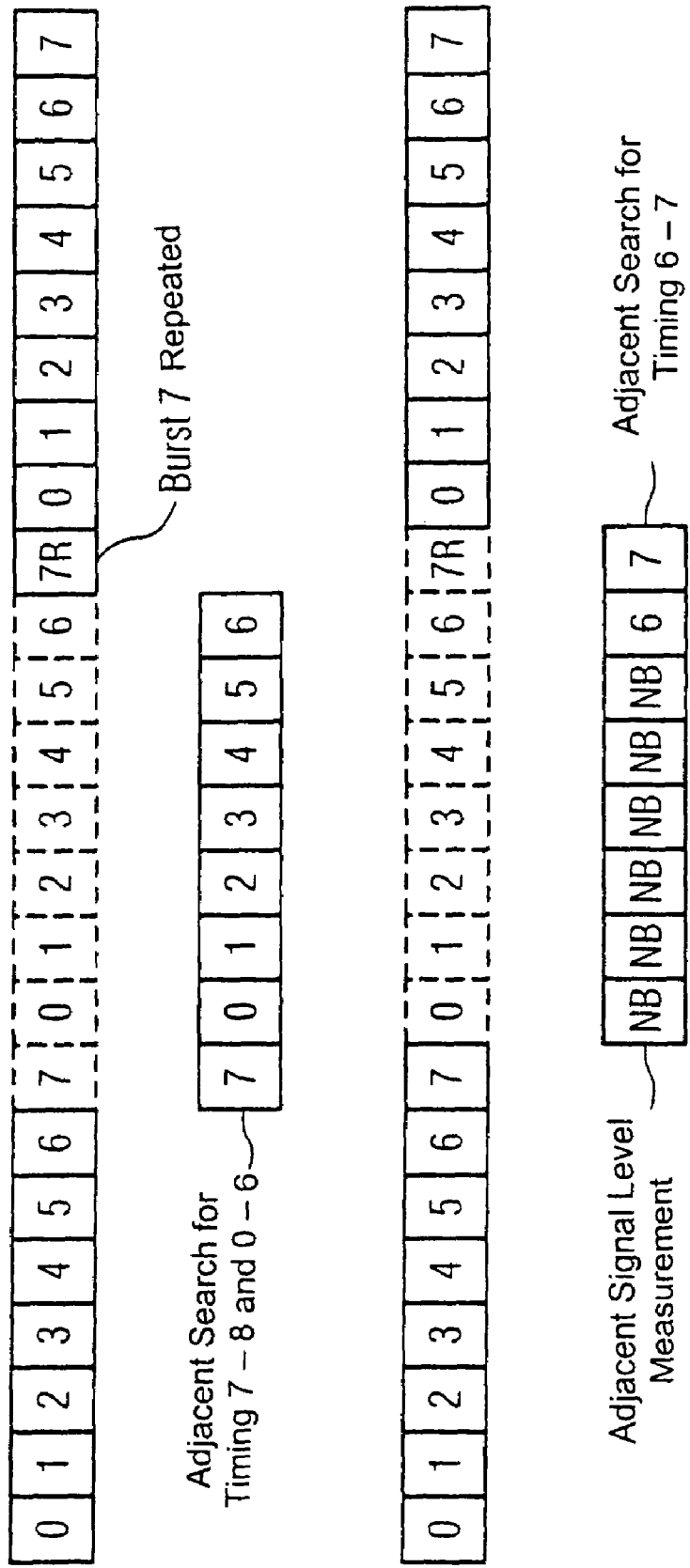
FIG. 4 a diagrammatic illustration of a third exemplary embodiment FIG. 2.

In the exemplary embodiment shown in FIG. 4, the receiving unit 6 of the mobile station 5 is switched to reception of synchronization data packets from the adjacent base station 9 during all the timeslots 7, 0 . . . 6. In the next predetermined time frame, which is shown in the lower line in FIG. 4, the first six timeslots 0, 1 . . . 5 are then used for measurement of the signal levels from adjacent base stations, while the last two timeslots 6, 7 are used to search for synchronization data packets.

Figure 5:
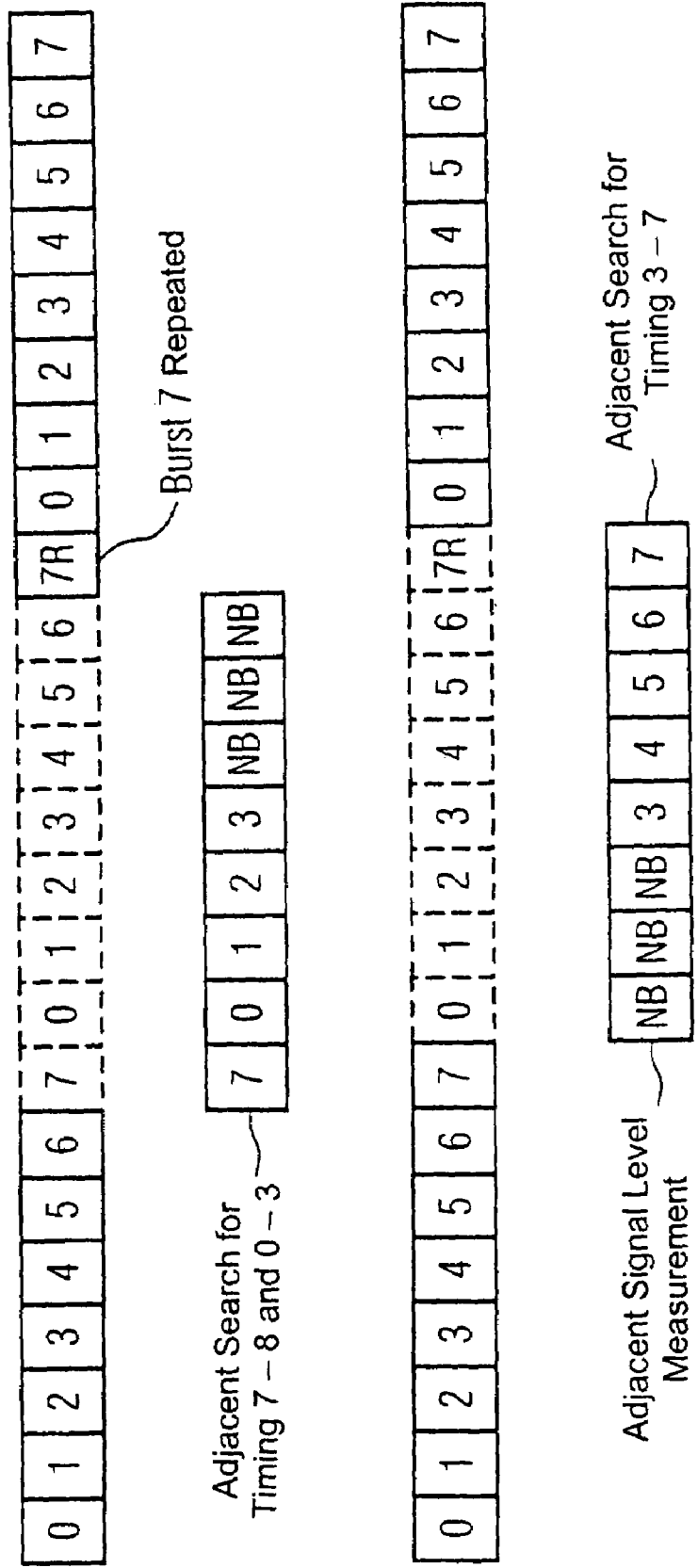
FIG. 5 a diagrammatic illustration of a fourth exemplary embodiment FIG. 2.

In the exemplary embodiment shown in FIG. 5, the last three timeslots of the predetermined time frame are used for measurement of signal levels from adjacent base stations, while the first five timeslots 7, 0, . . . 3 are used to search for synchronization data packets. In the predetermined time frame following the search, which is shown in the lower line of FIG. 5, the first three timeslots 0, 1, 2 are then used for measurement of signal levels from adjacent base stations, while the last five timeslots 3, 4, . . . , 7 are used to search for synchronization data packets.

Figure 6:
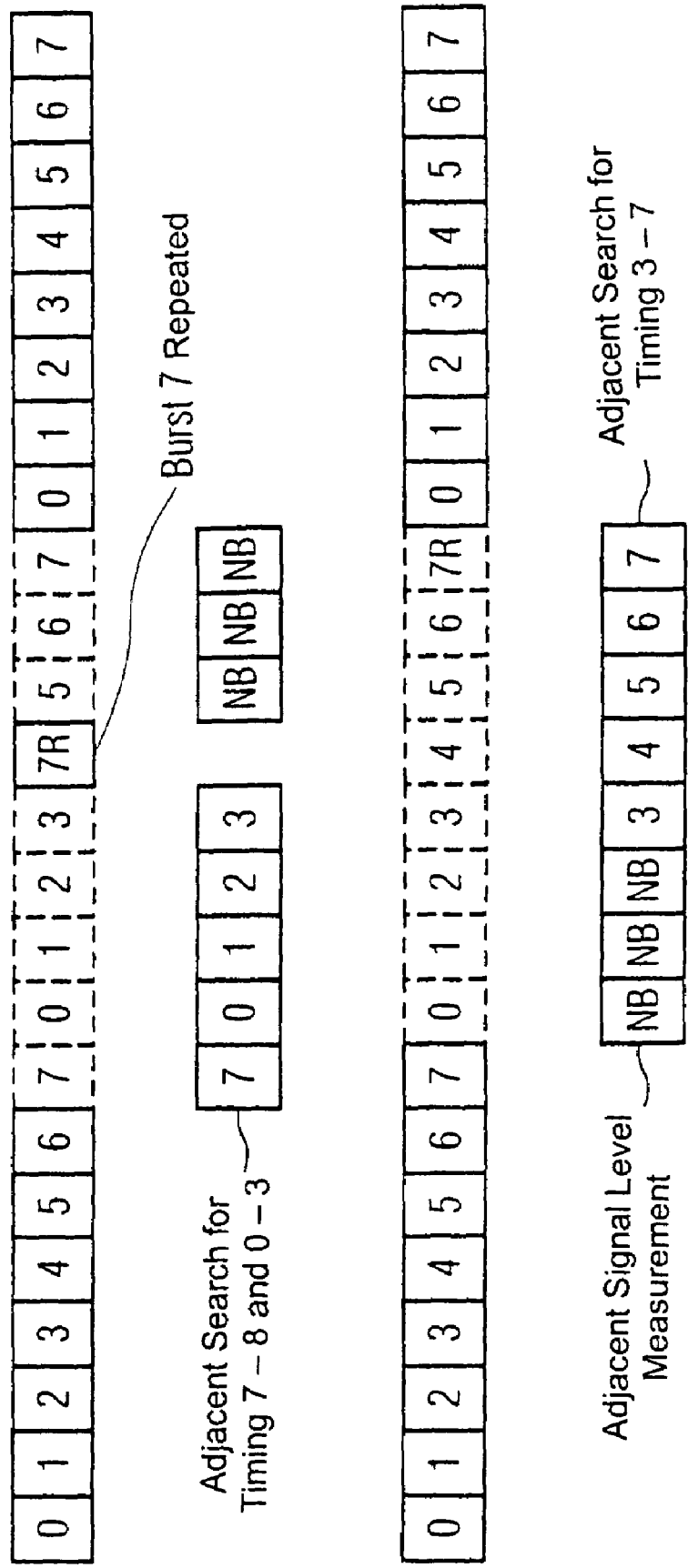
FIG. 6 a diagrammatic illustration of a fifth exemplary embodiment FIG. 2.

In the exemplary embodiment shown in FIG. 6, the first five timeslots 7, 0, . . . , 3 of the predetermined time frame are used to search for synchronization data packets from adjacent base stations, while the base station 1 transmits the data packet 7R once again in the fifth timeslot 4, this being the data packet that it had already transmitted immediately before the blank time frame. In the next three timeslots, the mobile station 5 measures signal levels from adjacent base stations. In the next predetermined time frame, which is shown in the lower line of FIG. 6, the signal levels from adjacent base stations are measured in the first three timeslots of the blank time frame, while a search for synchronization data packets is carried out in the following five timeslots 3, 4, . . . , 7.

In the exemplary embodiment shown in FIG. 7, the base station 1 transmits the data packet in the timeslot 0 immediately after the end of the predetermined time frame, right at the start of the predetermined time frame, as is shown by the small box 0R. In the first three timeslots of the blank time frame, the mobile station 5 measures signal levels from adjacent base stations, while the mobile station 5 searches for synchronization data packets in the last five timeslots 4, 5, . . . 0. In the next predetermined time frame, which is shown in the lower line of FIG. 7, the mobile station 5 searches during the first five timeslots 0, 1 . . . 4 of the predetermined time frame for synchronization data packets from adjacent base stations, while it carries out a measurement of the signal levels from adjacent base stations in the last three timeslots.

A common feature of all of the exemplary embodiments of FIGS. 2 to 7 is that the mobile station 5 at least partially fails to receive the respective data packet transmitted immediately before and/or after the predetermined time frame because the single receiving unit 6 of the mobile station 5 switches to reception of synchronization data packets and/or measurement of signal levels from adjacent base stations during a time period that is longer than a predetermined time frame.

If the transmitting unit 3 of the base station 1 does not carry out any repetition of data packets whatsoever, the receiving unit 6 of the mobile station 5 can also suppress reception of the last timeslot before the predetermined time frame, or the first timeslot after the predetermined time frame. Specifically, because the data to be transmitted are coded redundantly in the base station 1, the data received by the mobile station 5 can be completely decoded if the field strengths and/or reception conditions are correspondingly good. However, if the reception conditions are not optimal, increased error rates can be expected. If the data packets in the two timeslots at the boundary of the predetermined time frame were both partially not received, a better distribution of any existing bits would result so that adequate reception quality may be obtained in relatively poor reception conditions.

Figure 8:
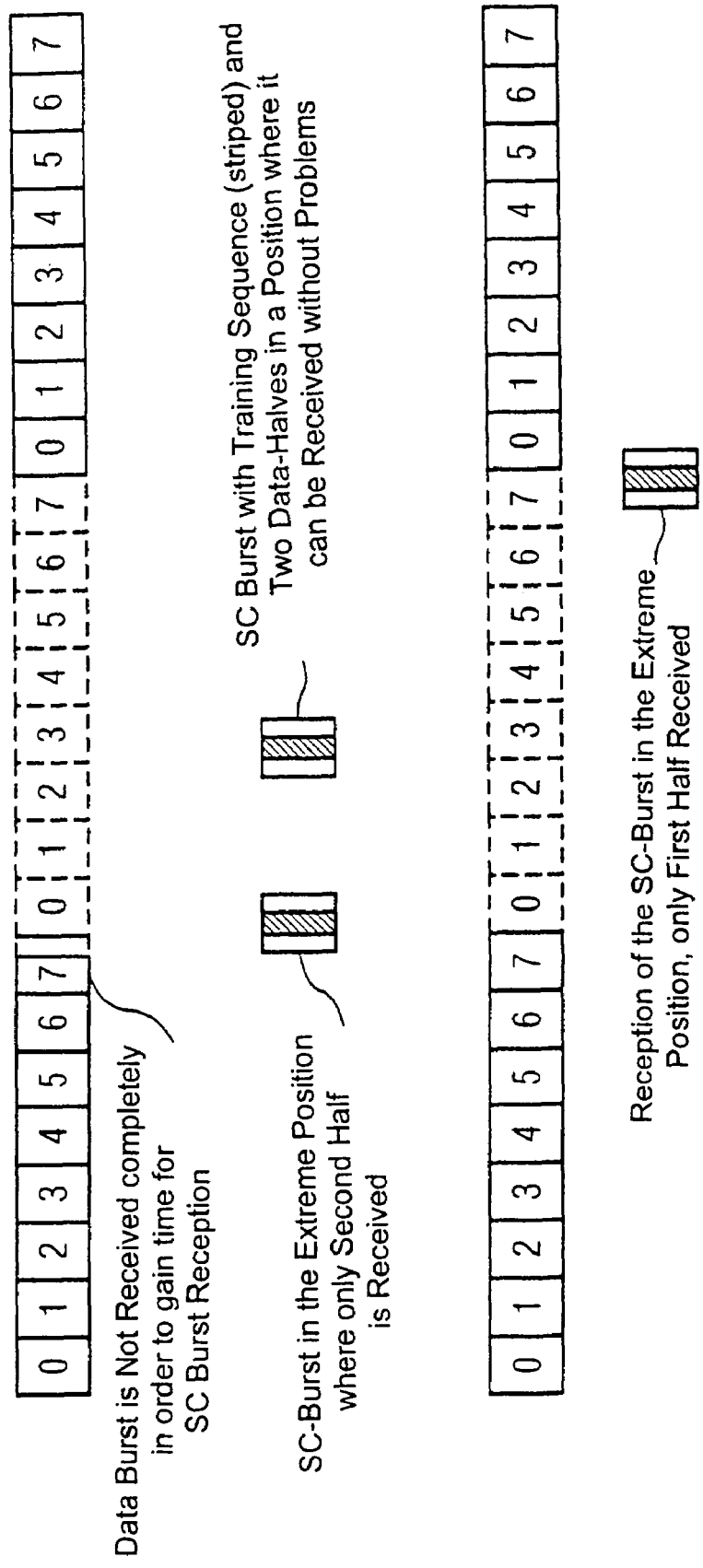
FIG. 8 a diagrammatic illustration of a seventh exemplary embodiment FIG. 2.

In the seventh exemplary embodiment of the invention, shown in FIG. 8, the length of the time interval during which the receiving unit 6 of the mobile station 5 switches to reception of synchronization data packets and/or measurement of signal levels from adjacent base stations, is chosen such that the receiving unit 6 of the mobile station 5 can receive a first portion of a synchronization data packet in a first time interval, and can receive a second portion of a synchronization data packet in a second time interval.

In FIG. 8, the first time interval is represented by the dashed small boxes 0, 1 . . . 7 in the first line, while the second time interval is likewise identified in the second line by dashed small boxes 0, 1 . . . 7. If the same data are always coded in the synchronization data packet, it is possible simply to receive the burst in two parts, bit numbers 3 to 105 (the first half) being received first, and bit numbers 42 to 144 (the second half) being received later. The training sequence (bit numbers 42 to 105) must be received twice because they are required for assessing the channel distortion, which is then used for equalization of the wanted data. However, a shorter section for the training sequence could also be sufficient, as a result of which the necessary time interval is further shortened. The training sequence of the synchronization data packet is of such a length that it can easily be found by correlation. A shorter training sequence will be sufficient to assess the channel impulse response. However, it would then be necessary to solve an equation system rather than using the correlation method. Depending on the reception conditions, the necessary portion of the training sequence may also be shorter or longer.

However, the data in the synchronization data packet are not constant but also contain the respective time frame number. The time frame number is contained in coded form in the respective training sequence. If the time frame number is decoded, then only a single bit changes in the majority of cases. The change by one bit can be represented by an exclusive-OR operation. The nature of the coding of the synchronization data packet (convolution code and fire code) makes it relatively easy to carry out such an exclusive-OR operation on the coded bits as well, and, thus, to use the first half of the synchronization data packet received at one time to calculate at another time the half of the synchronization data packet that was not received. In the case of convolution codes, the relevant coded bits just need to be inverted, and with fire codes, the corresponding polynomial division governs the bits to be changed before use of the convolution code, and the bits to be inverted.

Thus, decoding can be carried out conventionally. The decoding is, of course, successful only in 50% of cases, in which only one bit is actually different. If the decoding fails, then the cases in which the corresponding bits of the coded time frame number in the training sequence change may then also be considered successively. As an alternative, a further decoding attempt may also be made at a later time. The later time would be 26+(4 or 5)×51=230 or 281 time frames later.

In the seventh exemplary embodiment, the time interval in which the mobile station is switched to reception of synchronization data packets from adjacent base stations does not need to be nine timeslots long, but eight timeslots plus the length of the portion of the training sequence required for channel assessment+the length of one data half of the synchronization data packet. The time for the second data half of the synchronization data packet, possibly plus the portion of the training sequence that is not required for decoding, is thus saved. Wanted data packets may be received in the time that is saved.

The seventh exemplary embodiment is advantageous, in particular, in combination with one of the preceding exemplary embodiments if, the receiving unit 6 of the mobile station 5 requires too much time to change over to the appropriate channel for reception of synchronization data packets from adjacent base stations.

As already mentioned above, multiple timeslot mobile stations have been defined in order to increase the data rate over the data rate of standard mobile stations, and they receive and transmit data in a plurality of timeslots. If such a multiple timeslot mobile station has to transmit and receive simultaneously, because transmitting and receiving timeslots are superimposed, then the complexity of the mobile station configuration is considerably increased. The complexity is increased because the transmitting unit and the receiving unit cannot share any common components (such as a synthesizer, power supply, parts of A/D and D/A converters, and timing signals), the receiving unit must be shielded from the transmitter sufficiently well so that the transmitter does not interfere with it (requiring more complex shielding measures), and a duplexer must be used toward the antenna. However, with the prior art, the advantageous situation is possible only when at most two timeslots are used for transmission and at most five timeslots are used for reception. In the class breakdown for GSM mobile stations, Type 1 mobile stations, that is to say mobile stations that do not transmit and receive at the same time, are, thus, defined for a limited combination of transmission/reception timeslots.

FIG. 9 shows such an overlap of transmission and reception timeslots in a mobile station. The first line in FIG. 9 shows the received timeslots 0, 1, 2, 3 through solid lines. The transmitted timeslots 1, 2, 3 in the second line are likewise shown through solid lines. The overlap area between the transmitted timeslot 1 and the received timeslot 3 is not equal to zero for a timing advance. The example illustrated in FIG. 9 relates to a 4E3S mobile station, in which a maximum of four timeslots are received successively and a maximum of three timeslots are transmitted successively. Apart from the overlap area, no timeslots are transmitted while timeslots are being received, and vice versa.

Therefore, the prior art mobile stations have the disadvantage that the overlap between the transmission and reception timeslots explained in FIG. 9 requires increased complexity for elements in the mobile stations. Furthermore, half-duplex mobile stations are introduced. In these mobile stations, the mobile station only receives, but does not transmit, for a predetermined time, and also does not carry out any adjacent channel measurements. The mobile station then has a reception pause in which it carries out adjacent channel measurements, and after which it switches to transmission. The condition is of particular interest for asymmetric operation, for example, when there is a high data rate in the downlink, but a low data rate in the uplink (Internet surfing). A disadvantage with the method is the fact that, due to the pauses, the transmission capacity of the base station cannot be fully utilized.

In the eighth and ninth exemplary embodiments, the problem is countered in that a first mobile station does not transmit data packets while being switched to reception of data packets at the same time, while a second mobile station is switched to reception of data packets in timeslots in which the first mobile station is transmitting data packets and transmitting data packets in timeslots in which the first mobile station is switched to reception of data packets.

Figure 10:
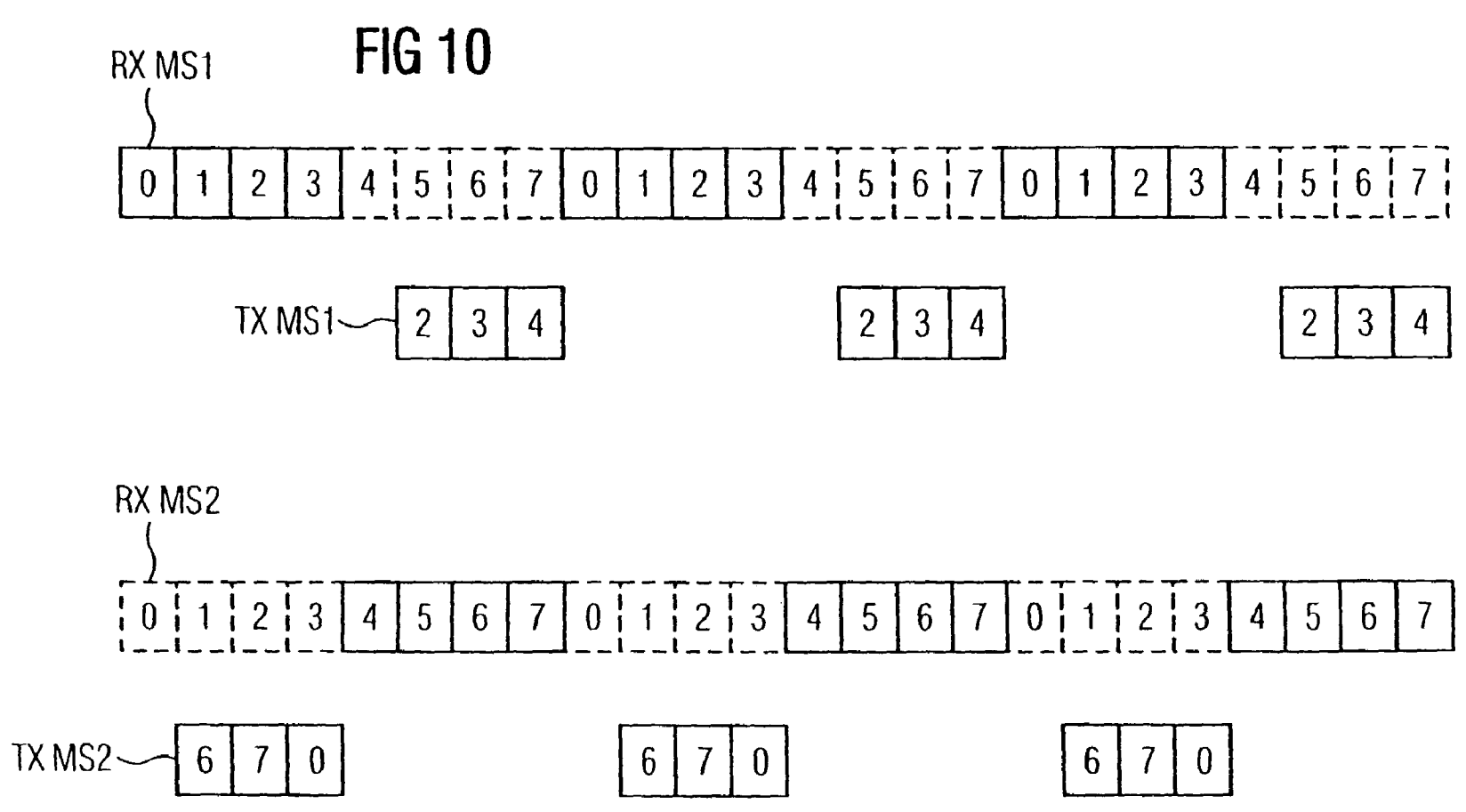

The first line of FIG. 10 uses solid lines to show the timeslots 0, 1, 2, 3 in which data packets are transmitted by a first mobile station and, in the second line, shows those timeslots 2, 3, 4 in which data packets are received by the first mobile station. In the third line, those timeslots 4, 5, 6, 7 are each shown by solid lines in which data packets are received by the second mobile station, while, in the fourth line, those timeslots 6, 7, 0 are shown in which data packets are transmitted by the second mobile station. Those transmission and reception timeslots that would be used for simultaneous transmission and reception in a mobile station are thus shifted in time to other timeslots, with simultaneous transmission and reception being impossible. Thus, in fact, the mobile station occupies more timeslots overall, and, thus, uses more network resources than necessary. However, the use is compensated for by the fact that the second mobile station transmits and receives in an interleaved manner such that all eight timeslots per time frame are nevertheless used. The second mobile station may either likewise be a mobile station that transmits according to the invention, or a conventional multiple timeslot mobile station that, however, transmits in fewer timeslots than the timeslots in which it receives.

The eighth exemplary embodiment, which is shown in FIG. 10, illustrates how two 4E3S mobile stations transmit and receive without any overlap. The exemplary embodiment also applies when the second mobile station receives in four timeslots and transmits in two timeslots, in which case the transmission timeslot 0 is not occupied by the second mobile station (fourth line in FIG. 10).

Figure 11:
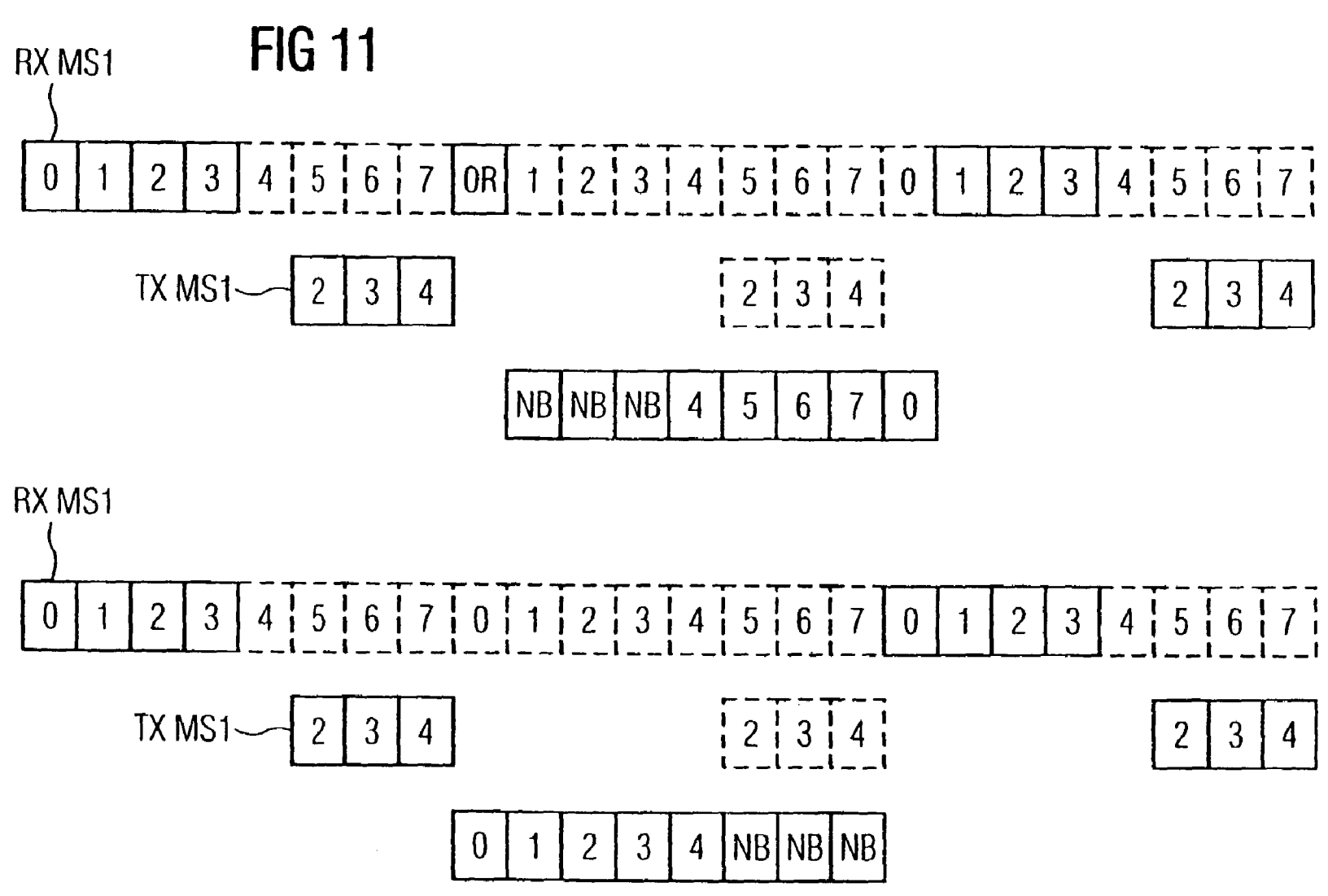

The ninth exemplary embodiment, shown in FIG. 11, illustrates the necessary combination with one of the preceding exemplary embodiments 2 to 7. One of the exemplary embodiments 2 to 7 must, of course, be used at the same time in order to allow synchronization with adjacent base stations to be carried out because the time to search for synchronization data packets from adjacent base stations in the predetermined time frame takes up less than nine timeslots. As can be seen in FIG. 11, the base station 1 transmits the data packet of the timeslot immediately after a predetermined time frame immediately before the start of the predetermined time frame, as is shown by the timeslot 0R. The first mobile station, however, carries out a measurement of the signal levels of adjacent base stations in the first three timeslots of the predetermined time frame while, in the next five timeslots 4, 5, . . . 0, it searches for synchronization data packets from adjacent base stations. The lower half of FIG. 11 shows the adjacent channel search for the first mobile station in the next predetermined time frame, in which the mobile station searches for synchronization data packets from adjacent base stations in the first five timeslots 0, 1 . . . , 4, and measures the signal levels from adjacent base stations in the last three timeslots. The first mobile station, explained by way of example in FIG. 11, is likewise a 4E3S mobile station.

I claim:

1. In a method for transmission of data packets between at least one base station and at least one mobile station in a mobile radio system, an improvement which comprises:
   transmitting each of the data packets in time frames having a fixed number of timeslots;
   transmitting the data packets from the mobile station in a plurality of successive timeslots;
   transmitting at least one of control data packets and no data packets from a given base station to the mobile station during predetermined time frames while the mobile station is connected to the given base station;
   respectively making available to the mobile station a time interval longer than a predetermined time frame for at least one of receiving synchronization data packets and measuring signal levels of adjacent base stations; and
   transmitting the data packet from the given base station at least one of immediately before and immediately after a predetermined time frame is at least partially not received by the mobile station.

2. The method for transmission of data packets according to claim 1, which comprises, during the time interval, switching the mobile station to reception of at least one of synchronization data packets and measurement of signal levels of adjacent base stations.

3. The method for transmission of data packets according to claim 1, which comprises reconstructing with the mobile station data packets at least partially not received using redundant coding of other received data packets.

4. The method for transmission of data packets according to claim 1, which comprises transmitting once again the data packet transmitted by the given base station at least one of immediately before and immediately after the predetermined time frame on at least one of an end and a start of the predetermined time frame.

5. The method for transmission of data packets according to claim 1, which comprises transmitting once again the data packet transmitted by the given base station at least one of immediately before and immediately after the predetermined time frame during the predetermined time frame, and receiving the data packet by the mobile station.

6. The method for transmission of data packets according to claim 1, which comprises choosing a length of the time interval during which the mobile station is switched to reception of synchronization data packets from adjacent base stations such that the mobile station can receive a first part of a synchronization data packet in a first time interval, and can receive a second part of a synchronization data packet in a second time interval.

7. The method for transmission of data packets according to claim 6, which comprises allowing a channel equalization to be determined by having the first part of the synchronization data packet and the second part of the synchronization data packet each contain at least one section of a training sequence of the synchronization data packet.

8. The method for transmission of data packets according to claim 1, which comprises:
- transmitting data packets from a first mobile station and switching the first mobile station to receiving data packets at different times;
- switching a second mobile station to reception of data packets in timeslots during which the first mobile station is transmitting data packets; and
- transmitting data packets in timeslots during which the first mobile station is switched to reception of data packets.

9. A system for transmission of data packets in a mobile radio system, comprising:
- at least one base station having a transmitting unit; and
- at least one mobile station having a receiving unit,
- said at least one base station and said at least one mobile station transmitting data packets in time frames having a fixed number of timeslots,
- said at least one mobile station transmitting data packets in a plurality of successive timeslots, in which, while said at least one mobile station is connected to a given one of said at least one base station, said transmitting unit of said given one of said at least one base station transmits at least one of control data packets and no data packets to said at least one mobile station during a predetermined time frame,
- a respective one of said receiving units of said at least one mobile station having an available time interval longer than the predetermined time frame for at least one of receiving synchronization data packets and measuring signal levels of adjacent base stations,
- said receiving unit of said at least one mobile station at least partially not receiving a data packet transmitted by said transmitting unit of said given base station at least one of immediately before and immediately after the predetermined time frame.

10. The system for transmission of data packets according to claim 9, wherein said receiving unit of said at least one mobile station switches to at least one of reception of synchronization data packets and measurement of signal levels of adjacent base stations during the predetermined time interval.

11. The system for transmission of data packets according to claim 9, wherein said at least one mobile station has a processing unit reconstructing data packets at least partially not received using redundant coding of other received data packets.

12. The system for transmission of data packets according to claim 9, wherein said transmitting unit of said given base station transmits once again a data packet transmitted at least one of immediately before and immediately after the predetermined time frame on at least one of the end and the start of the predetermined time frame.

13. The system for transmission of data packets according to claim 9, wherein said transmitting unit of said given base station transmits once again the data packet transmitted at least one of immediately before and immediately after the predetermined time frame during the predetermined time frame, and said receiving unit of said at least one mobile station receives the data packet.

14. The system for transmission of data packets according to claim 9, wherein a length of the time interval during which said receiving unit of said at least one mobile station switches to reception of synchronization data packets from adjacent base stations is chosen such that said receiving unit of said at least one mobile station can receive a first part of a synchronization data packet in a first time interval, and can receive a second part of a synchronization data packet in a second time interval.

15. The system for transmission of data packets according to claim 14, wherein the first part and the second part of the synchronization data packet each contain at least one section of a training sequence of the synchronization data packet allowing a respective channel equalization to be determined.

16. The system for transmission of data packets according to claim 9, wherein said at least one mobile station is two mobile stations including a first mobile station transmitting data packets and switched to receiving data packets at different times, and a second mobile station switched to receiving data packets in timeslots during which said first mobile station transmits data packets and transmits data packets in timeslots during which said first mobile station is switched to reception of data packets.

* * * * *